United States Patent

Ommori et al.

[11] Patent Number: 5,422,774
[45] Date of Patent: Jun. 6, 1995

[54] MAGNETIC TAPE CASSETTE HAVING IMPROVED SLIDER LOCK

[75] Inventors: Shozo Ommori; Shigeru Nishiyama, both of Kanagawa, Japan

[73] Assignee: Fuji Photo Film Co., Ltd., Kanagawa, Japan

[21] Appl. No.: 208,960

[22] Filed: Mar. 11, 1994

[30] Foreign Application Priority Data

Mar. 15, 1993 [JP] Japan ............................... 5-016832 U
Apr. 13, 1993 [JP] Japan ............................... 5-024110 U

[51] Int. Cl.$^6$ .............................................. G11B 23/08
[52] U.S. Cl. ................................................. 360/132
[58] Field of Search ........................... 360/132; 242/199

[56] References Cited

U.S. PATENT DOCUMENTS

| 5,143,317 | 9/1992 | Sugiyama | 360/132 X |
| 5,144,511 | 9/1992 | Katagiri et al. | 360/132 |
| 5,321,571 | 6/1994 | Enomoto et al. | 360/132 |

FOREIGN PATENT DOCUMENTS 2152009  7/1985  United Kingdom ............... 360/132

Primary Examiner—John H. Wolff

[57] ABSTRACT

A magnetic tape cassette includes a slider fitted slidably along a bottom of a cassette case, as well as resiliently locking pieces formed in the bottom of the cassette case along the bottom in a cantilevered fashion and each having a head at a free end thereof for fitting in an engaging hole in the slider so as to retain the slider. Each of the resiliently locking pieces has a compression coil spring provided between the head 12a and an upper half 11a of the cassette case to maintain a resilient force for the head in a thickness-wise direction of the cassette. When the head is pushed into the cassette case by more than a predetermined amount, coils of the compression coil spring are set in a state of close contact with each other in a compressing direction of the spring so as to support the head from an inward direction of the cassette and positionally restrict the displacement of the resiliently locking piece in the inward direction of the cassette.

10 Claims, 4 Drawing Sheets

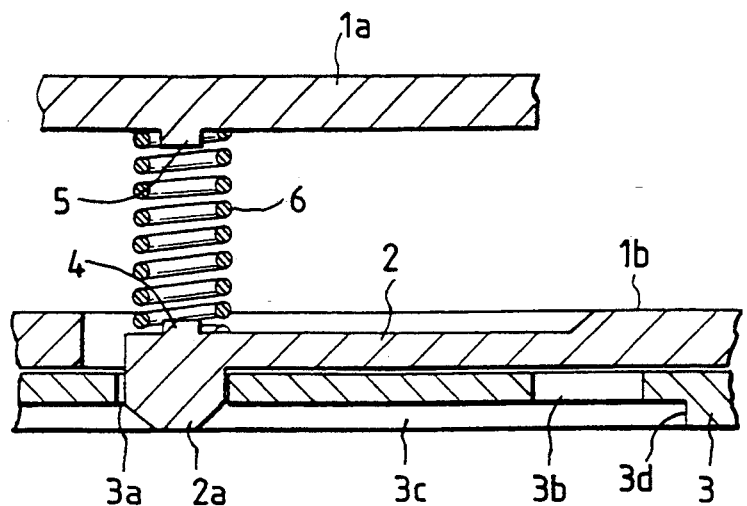
FIG. 1 PRIOR ART
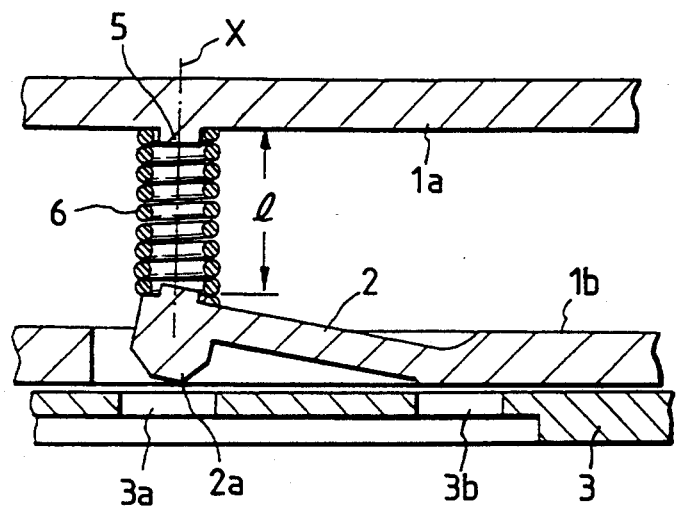
FIG. 2 PRIOR ART
FIG. 3 PRIOR ART
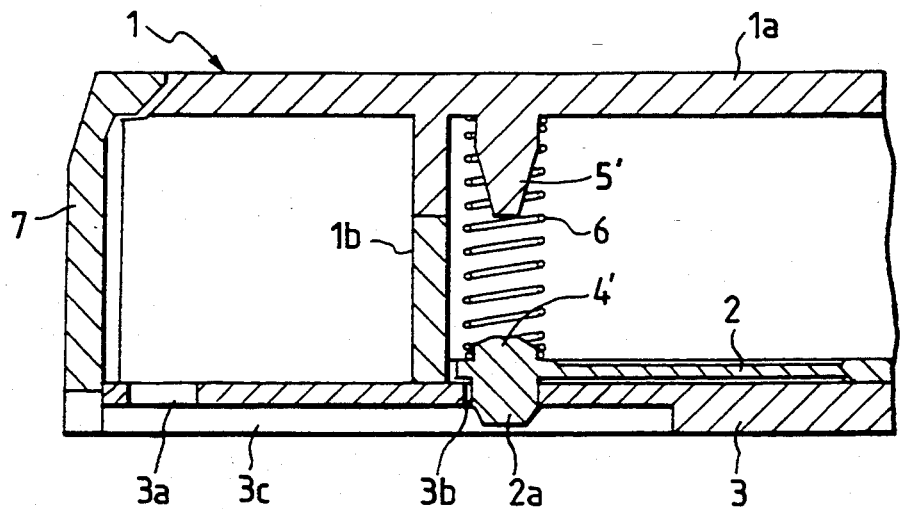

MAGNETIC TAPE CASSETTE HAVING IMPROVED SLIDER LOCK

BACKGROUND OF THE INVENTION

1. Field of the Invention

The present invention relates to a magnetic tape cassette, and more particularly to a magnetic tape cassette for use in effecting recording and reproduction by means of digital signals.

2. Related Art

Conventionally, magnetic tape cassettes have been used for PCM recording/reproducing apparatuses for converting analog information such as acoustic signals into digital signals, e.g., PCM signals, so as to record and/or reproduce the same on magnetic tape. In this magnetic tape cassette, since it is compact and lightweight, and high-density recording is effected, a structure is particularly adopted for preventing fingers from coming into contact the magnetic tape or dust from attaching to the same.

That is, if fingers come into contact with the magnetic tape or dust attaches to the same, a dropout occurs in a reproduced signal. Hence, in order to prevent this, it is necessary to hermetically seal the magnetic tape in a cassette case as much as possible such as during storage of the cassette. Meanwhile, when the cassette is used, insertion holes for reel shafts and a space for inserting guides and the like during recording and/or reproduction are naturally required in the cassette case. As a structure which is adopted in view of such a need, a lid for opening or closing a front portion of the cassette and a slider which slides in a transverse direction of the cassette in contact with the bottom of the cassette are provided.

As a conventional cassette case having such a function, a DAT cassette having a mechanism for locking a slider 3 is known, as shown in FIGS. 1 and 2. In this cassette, a resiliently locking piece 2 is a cantilevered arm formed in a bottom of a lower half 1b in the form of a cutout, and has a smaller thickness than the lower half 1b, and a head 2a adapted to be fitted in engaging holes 3a and 3b provided in a guiding shallow groove 3c of the slider 3 is formed at a distal end thereof.

In addition, center lines of the resiliently locking piece 2 and the guiding shallow groove 3c of the slider 3 in the transverse direction of the cassette overlap with each other. FIG. 1 shows a state in which the head 2a of the resiliently locking piece 2 is fitted in the rear engaging hole 3b in the slider 3 (i.e., a state in which the aforementioned space is closed by the slider).

A spring-receiving projection 4 is formed on the inner side of the head of the resiliently locking piece 2, while a projection 5 for fitting a spring at a position corresponding to this projection 4 is formed on the inner side of an upper half 1a. A compression coil spring 6 is interposed between these two projections so as to urge the resiliently locking piece 2 toward the slider 3 (toward the lower side).

However, with the above-described conventional arrangement, in order to avoid interference with the tape and the like accommodated in the cassette case, the coil diameter of the compression coil spring 6 is formed to be small as compared with its free-length direction (extending and contracting direction), and the compression coil spring 6 tends to be used as a relatively elongated compression spring. As a result, there is no problem if the compression coil spring 6, when compressed, operates such as to contract positively in the compressing direction, but there are cases where it is deformed such as to be twisted in the radial direction of its coil (in the lateral direction). Such unexpected behavior of the compression coil spring causes a lack in the stability of spring pressure, so that its function becomes impaired.

Meanwhile, if the resiliently locking piece 2 is provided with a structure for restricting its movement in the inward direction of the cassette, it is possible to contribute to the stabilization of the function of the resiliently locking piece. However, although it is desirable to provide this restricting effect at the distal end side of the resiliently locking piece 2, if a structure is adopted in which this restricting member is provided at the distal end or in its vicinity, there has been a problem in that the restricting member interferes with the compression coil spring or imparts a restriction to the arrangement of the compression coil spring.

There have been known the other type of conventional cassette case having such a function, those disclosed in, for instance, Unexamined Japanese Utility Model Application (OPI) Nos. Sho. 61-121580 and Sho. 62-147188, and Japanese Patent Publication No. Sho. 62-189687.

The one disclosed in Unexamined Japanese Utility Model Application No. Sho. 61-121580 is structured such that a limiter consisting of a large projection jutting out in the inward direction of the cassette is provided at a distal end of a resiliently locking piece, and this limiter is made to abut against an inner surface of an upper half so as to restrict an amount of deformation of the resiliently locking piece.

The one disclosed in Unexamined Japanese Utility Model Application No. Sho. 62-147188 is arranged such that a limiter member is disposed on the upper half or the resiliently locking piece in correspondence with the inner side of the resiliently locking piece to restrict an amount of deformation of the resiliently locking piece by means of the limiter member, and a wall portion surrounding the limiter member is provided.

As shown in FIG. 3, the one disclosed in Japanese Patent Publication No. Sho. 62-189687 is arranged such that a resiliently locking piece 2 is a cantilever formed in a bottom of a lower half 1b in the form of a cutout, and has a thickness smaller than the lower half 1b. A head 2a capable of fitting in engaging holes 3a, 3b formed in a shallow groove 3c of a slider 3 is provided at a distal end of the resiliently locking piece 2. A spring-receiving projection 4' is formed on the inner side of the head of the resiliently locking piece 2, while a projection 5' is formed on the inner side of an upper half 1a for fitting a spring at a position corresponding to this projection 4'. A coil spring 6 is interposed between these projections so as to urge the resiliently locking piece 2 toward the slider 3. FIG. 3 shows a cross-sectional view taken along the resiliently locking piece 2 in a transverse direction of the cassette, and illustrates a state in which the head 2a of the resiliently locking piece 2 is fitted in the rear engaging hole 3b in the slider 3.

However, of the above-described conventional examples, in the structure disclosed in the afore-mentioned Unexamined Japanese Utility Model Application No. Sho. 61-121580, the provision of a limiter, which is a long and large projection as compared with the thin-walled resiliently locking piece, at the distal end Of the locking piece is fraught with problems in that the flow of a resin in a cavity during molding lacks smoothness, thereby causing a decline in moldability. In addition, in the case of the arrangement disclosed in the aforementioned Unexamined Japanese Utility Model Application No. Sho. 62-147188, in a case where a long pin-shaped projection (limiter) is formed on the upper half side, if the projection becomes high, moldability becomes poor in the same way as described above owing to sink marks and the like on the upper half case. As a result, there has been a high risk of producing the problem that the accuracy in engagement between the limiter and the head of the resiliently locking piece declines, thereby making it impossible to sufficiently attain the original object.

Meanwhile, in the structure in which a coil spring is fitted as in the aforementioned Japanese Patent Publication No. Sho. 62-189687, the formation of a relatively long and large spring-receiving projection in the inward direction of the cassette in a projecting manner is advantage in the fitting of the spring and the like. Also, it is possible to expect the operation of the aforementioned limiter by causing this spring-receiving projection to project even further. However, in this case as well, not only does the moldability of the upper half case decline, but also there is the risk of producing unexpected engagement between the spring-receiving projection and the coil spring (e.g., engagement in which a tip of the spring-receiving projection is caught by the coil spring) in the case where the spring-receiving projection is made to jut out on a large scale. Thus, a portion of the coil spring which effectively operates as a spring may possibly change, so that there has been the risk of rendering the spring function unstable.

SUMMARY OF THE INVENTION

The present invention has been devised in view of such a conventional problem, and its first object is to prevent the bending of the compression coil spring in the lateral direction, and its second object is to provide an effective means for restricting the pushing-in depth of the head of the resiliently locking piece in the structure having the compression coil spring.

Another object of the invention is to provide a magnetic tape cassette which is improved to allow the position of the resiliently locking piece to be restricted without accompanying a decline in the moldability of the cassette case as in the conventional structure of positional restriction based on the projection on the cassette case.

The above and other objects are achieved by a provision of a magnetic tape cassette which, according to the present invention, includes a slider fitted slidably along a bottom of a cassette case in such a manner as to be capable of opening or closing a guide-inserting portion on a front side of the cassette case and reel-shaft inserting holes in the bottom of the case, and resiliently locking pieces formed in the bottom of the cassette case along the bottom in a cantilevered fashion and each having a head at a free end thereof for fitting in an engaging hole in the slider so as to retain the slider, each of the resiliently locking pieces being provided with a compression coil spring between the head and an upper half of the cassette case to maintain a resilient force for the head in a thickness-wise direction of the cassette, wherein when the head is pushed into the cassette case by more than a predetermined amount, coils of the compression coil spring are set in a state of close contact with each other in a compressing direction of the spring so as to support the head from an inward direction of the cassette and positionally restrict the displacement of the resiliently locking piece in the inward direction of the cassette. In addition, the positionally restricting action of the compression coil spring can be further enhanced by an arrangement in which the compression coil spring has a closely contacting area which is substantially not resilient in the compressing direction.

BRIEF DESCRIPTION OF THE DRAWINGS

FIG. 1 is a fragmentary enlarged cross-sectional view of a magnetic tape cassette in a conventional example;

FIG. 2 is an explanatory diagram of operation in FIG. 1.

FIG. 3 is a cross-sectional view of a portion taken along a resiliently locking piece in a conventional magnetic tape cassette.

DESCRIPTION OF THE PREFERRED EMBODIMENTS

Figure 4:
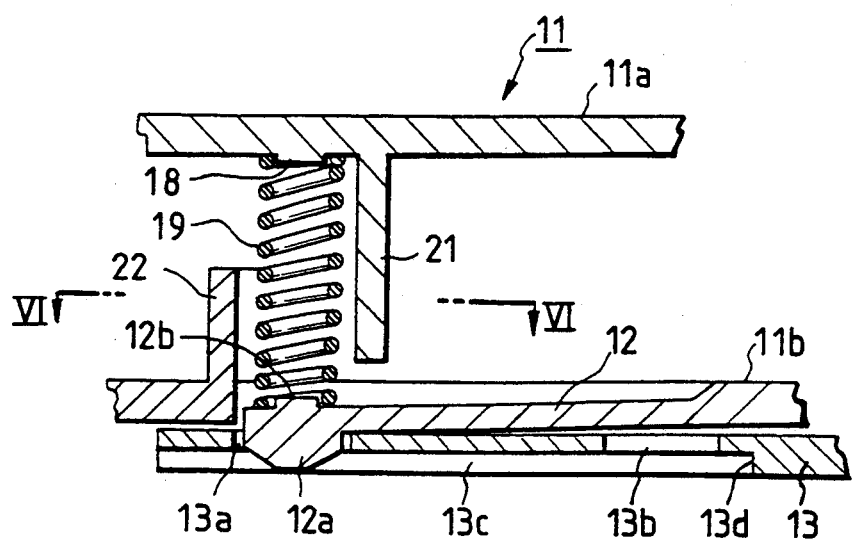
FIG. 4 is an enlarged cross-sectional view of an essential portion in accordance with a first embodiment of the present invention.

Referring now to the drawings, a description will be given of a first embodiment of the present invention. FIGS. 4 to 7 show a DAT cassette.

Figure 5:
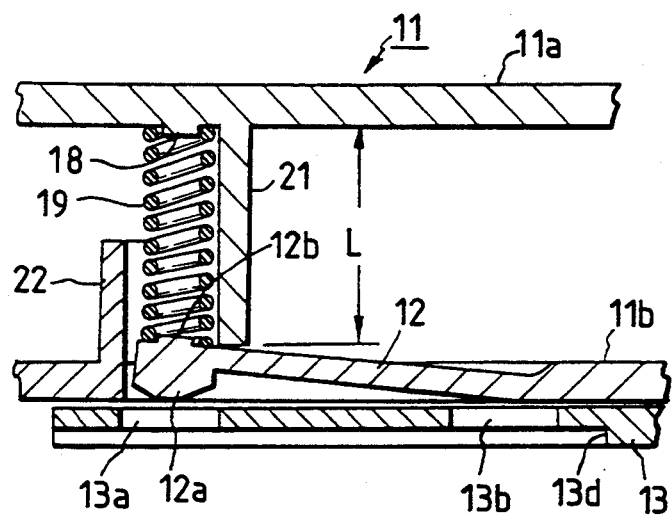
FIG. 5 is an explanatory diagram of operation in FIG. 4.
Figure 6:
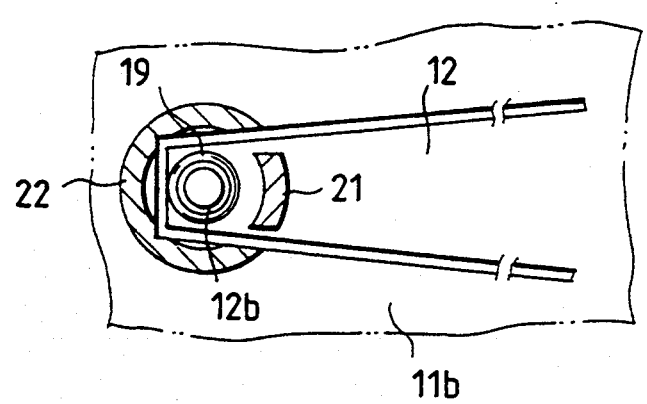
FIG. 6 is a cross-sectional view taken along line VI—VI in FIG. 4.

FIG. 4 is an enlarged cross-sectional view of an essential portion of a portion extending along a resiliently locking piece 12 in a state in which a slider 13 is fitted in a lower half 11b of a DAT cassette 11, and illustrates a state in which a head 12a of the resiliently locking piece 12 is fitted in an engaging hole 13a located close to the front portion of the slider 13 (a closed state). FIG. 5 is a cross-sectional view illustrating a state in which, in FIG. 4, the head 12a is pushed in the inward direction of the cassette. FIG. 6 is a cross-sectional view taken along line VI—VI in FIG. 4, and FIG. 7 is a perspective view of a bottom illustrating a state in which the cassette case 11 and the slider 13 are disassembled.

Figure 7:
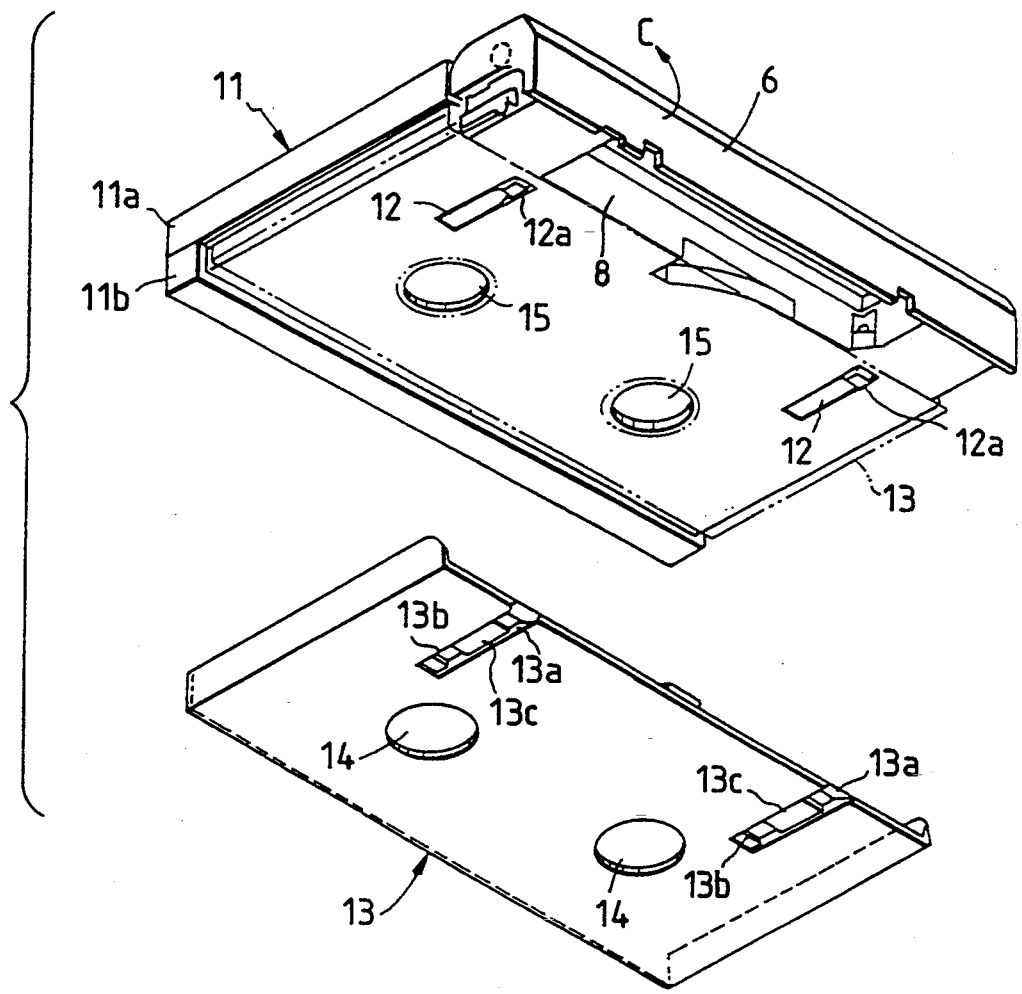
FIG. 7 is a perspective view of a bottom illustrating a state in which a cassette case and a slider are disassembled in accordance with the first embodiment.

As shown in FIG. 7, the cassette 11 is provided with the slider 13 which is fitted slidably along a cassette case bottom 10 so as to be capable of opening and closing a guide-inserting portion 8 on the front side of the cassette case, which is comprised of upper and lower cassette halves 11a, 11b, and a pair of reel-shaft inserting holes 15 in the bottom of the case. In addition, the cassette 11 is provided with a lid 6 which opens in such a manner as to be capable of opening and closing the front side of the case (in the direction of arrow C). The resiliently locking pieces 12 are formed integrally with the cassette lower half 11b, and they are formed in a cantilevered fashion along the bottom of the cassette (i.e., they extend in the forward direction of the cassette on both left- and right-hand sides of the cassette), and their heads 12a, which are their free ends, are arranged to be fitted in engaging holes 13a, 13b in the slider 13 so as to retain the slider 13 in position.

Each of the resiliently locking pieces 12 is formed in the lower half 11b in the form of a cutout, and has one end continuing from the lower half 11b in the cantilevered fashion, while the heads 12a for fitting in the engaging holes 13a, 13b in the slider 13 are formed at the other ends thereof. In addition, the resiliently locking piece 12 is vertically swingable with one end serving as a fulcrum. A spring-receiving portion 12b is formed on the inner side of the head 12a of the resiliently locking piece 12, and coil seat portions of a compression coil spring 19 are respectively fixed at the spring-receiving portion 12b and a spring-receiving portion 18 formed at an inner position of the upper half 11a corresponding to the spring-receiving portion 17. The head 12a is pressed and urged toward the slider 13 by means of the compression coil spring 19. The spring constant of the compression coil spring 19 is set to a value of such a measure that allows the locking-piece head 12a to be brought into smoothly sliding contact with the slider 13 and allows the head 12a to be positively fitted and locked in each engaging hole 13a, 13b in the slider 13.

As shown in FIG. 6, an upper wall 21 and a lower wall 22 are provided projectingly on the upper half 11a and the lower half 11b of the cassette case, respectively, in proximity to the compression coil spring 19 in such a manner as to surround the same. In the first embodiment, cross sections of these walls are formed Such that their overall cross-sectional configuration forms a substantially circular ring, i.e., the lower wall 22 is formed in the shape of a large arc, and the upper wall is formed in the shape of a small arc. In addition, the vertical length of the upper wall 21 is set to be such a length (L) that the upper wall 21 abuts against the resiliently locking piece 12 when the head 12a of the resiliently locking piece 12 is pressed by an external force to a depth exceeding a predetermined depth (see FIG. 5). Preferably, the length (L) may be defined within a range between 5 mm to 7 mm in this embodiment.

In addition, the height of the lower wall 22 is set to a height capable of preventing the bending of the axis of the spring in correspondence with the free length and the coil diameter of the compression coil spring.

As for the slider 13, when the cassette is loaded in a deck (a cassette-loading section of a recording/reproducing apparatus), the lid 6 rotates in the direction of arrow C in FIG. 7 and opens the front side of the space 8, and projecting members on the deck side are guided into shallow grooves 13c from the front of the cassette, are brought into contact with the heads 12a respectively fitted in the engaging holes 13b, and push them upward against the resilient forces of the compression coil springs 18, thereby temporarily canceling the sliding lock. Then, the projecting members engage rear ends 13d at the shallow grooves 13c, and slide the slide 13 in the rearward direction. Then, when the heads 12a are fitted in the front engaging holes 13a at the position of a substantial limit of retraction of the slider 13, the slider 13 is locked in the open state, and the space 8 is opened. At the same time, reel-shaft inserting holes 14 in the lower cassette half 11b and the reel-shaft inserting holes 15 on the slider side overlap with each other concentrically, and are set in an open state.

In the above-described process of cassette loading, an external force that will exceed a predetermined operating range is presented from being applied to each of the heads 12a, so that the resiliently locking pieces 12 are capable of fulfilling their intended purpose.

In addition, in cases where the heads 12a of the resiliently locking pieces 12 are pressed in the inward direction of the cassette by means of fingers or pointed jigs so as to open the slider 13, a more-than-necessary external force might be applied to each of the heads 12a, thereby allowing the heads 12a to be pushed into the inner surface of the half.

However, even if an external force that would exceed the predetermined operating range in the inward direction of the cassette is applied to the heads 12a, the heads 12a respectively abut against the lower end faces of the upper walls 22, so that the pushing-in depth of the resiliently locking pieces 12 is restricted, thereby obviating the excessive deformation of the resiliently locking pieces 12

Thus, in this embodiment, since the upper wall and the lower wall formed projectingly from the upper and lower halves, respectively, are located in proximity to and surrounding the compression coil spring, interposed between the head 12a of the resiliently locking piece and the upper half of the cassette case, even if the coil spring tends to become deformed in the radial direction of its coil, the deformation and the like is prevented very effectively by means of the two walls. In addition, since these walls 21, 22 are formed separately on the upper and lower halves, respectively, the efficiency with which the compression coil spring 19 is assembled is not lowered. Further, if the pushing-in depth of the head 12a exceeds a predetermined depth, the resiliently locking piece 12 abuts against the lower end face of the upper wall 21 in the vicinity of its head, thereby positively restricting the pushing-in depth.

It should be noted that although, in this embodiment, the cross sections of the walls provided projectingly on the upper and lower halves are formed to be annular in shape, the present invention is not limited to annular-shaped walls. It goes without saying that a polygonal or other shape may be used, insofar as it is capable of preventing the curving or bending of the axis of the compression coil spring, even if the axis of the compression coil spring tends to be curved. In addition, the jutting-out height of the lower wall 22 is not confined to the above-described embodiment, and various modifications are possible.

Figure 8:
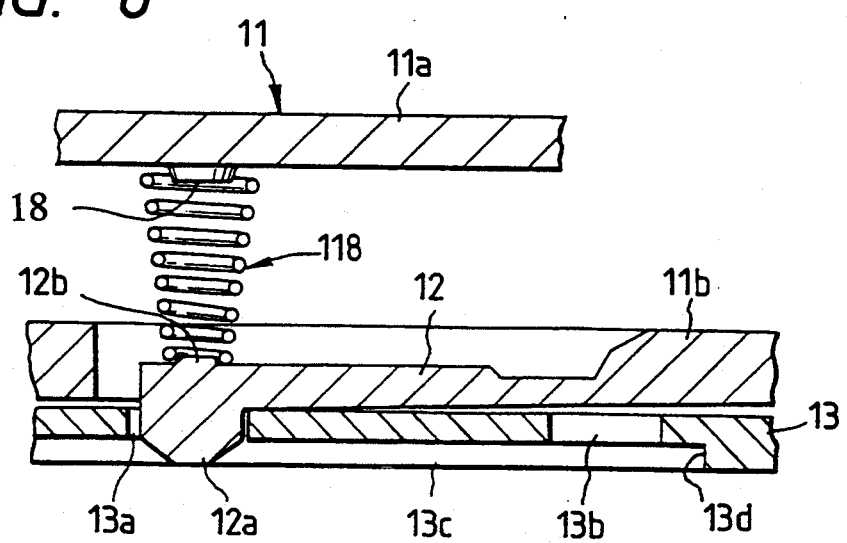
FIG. 8 is an enlarged cross-sectional view of an essential portion in accordance with a second embodiment of the present invention.
Figure 9:
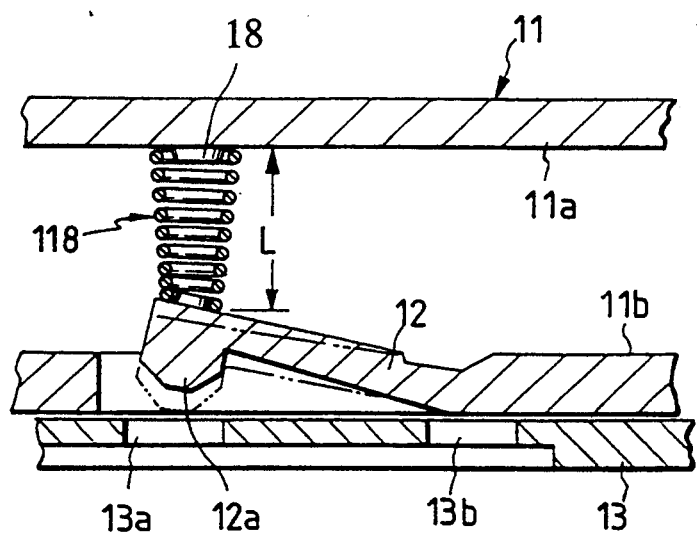
FIG. 9 is a cross-sectional view in a case where a compression coil spring is completely compressed in FIG. 8.

FIGS. 8 and 9 show a second embodiment of a magnetic tape cassette in accordance with the present invention.

FIG. 8 is a fragmentary enlarged cross-sectional view of a portion illustrating a state in which a slider 13 is fitted in a lower half 11b of the tape cassette, and a head 12a of a resiliently locking piece 12 is fitted in an engaging hole 13a in a slider 13.

The structure of the cassette case according to the second embodiment is the same as that of the first embodiment illustrated in FIG. 7 and described hereinabove.

In the above-described process of cassette loading, an external force that will exceed a predetermined operating range is prevented from being applied to each of the heads 12a, so that the resiliently locking pieces 12 are capable of effecting predetermined operation (the state shown by the phantom lines in FIG. 9).

In addition, in cases where the heads 12a of the resiliently locking pieces 12 are pressed in the inward direction of the cassette by means of fingers or pointed jigs so as to open the slider 13, a more-than-necessary external force would be applied to each of the heads 12a, thereby allowing the heads 12a to be pushed into the inner surface of the half.

However, even if a force which tends to cause the head 12a to approach the inner surface of the upper half 11a by narrowing a specific distance (L) acts due to this pushing-in force, the length of a compression coil spring 118 in a state in which the coils abut against each other (in a closely contacting state) is set to this specific distance (L). Therefore, the spring is not compressed more than that, so that the position of the head 12a in its movement in the inward direction of the cassette is restricted, so that the head 12a is prevented from being pushed in by more than a predetermined operating range. Namely, the compression coil spring 118 is capable of serving as a stopper which imparts a locking force to the head 12a of the resiliently locking piece 12 in the outward direction of the cassette and, at the same time, prevents the movement of the head 12a with respect to a more-than-necessary external force acting in the inward direction of the cassette. Preferably, the length (L) may be defined within a range between 4 mm to 6 mm in this embodiment.

It should be noted that, in the above-described embodiment, the coil diameter of the compression coil spring 118 may be fixed without being changed. The reason for the fact that the coil diameter in terms of the configuration of the compression coil spring 118 is made greater from the inner side of the head 12a toward the upper half 11a is to prevent the bending of the axis of the spring (bending when 1 the spring is compressed), thereby causing vertically adjacent ones of the coils to be brought into close contact with each other appropriately and imparting the action of maintaining this closely contacting state in a stable manner.

Figure 10:
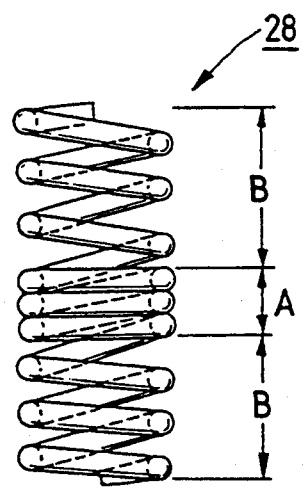
FIG. 10 is a side elevational view illustrating another form of the compression coil spring in accordance with the second present invention.

In addition, to stabilize the compression coil spring for preventing the occurrence of torsional deformation in the lateral direction of the spring diameter when the compression coil spring is compressed, it is possible to adopt an arrangement such as the one shown in FIG. 10, in addition to the arrangement in which the coil diameter is changed as in the above-described embodiment.

At its longitudinally intermediate-stage portion, for example, a compression coil spring 28 shown in FIG. 10 is provided with a closely contacting area A which is not resilient in the direction of compression. Accordingly, in this compression coil spring 28, the resilient force for pressing the head 12a is provided by flexible portions B, B above and below the closely contacting area A. Meanwhile, the rigidity of the compression coil spring 28 in the direction of the coil diameter is reinforced by the action in which the closely contacting area A serves as a rigid core.

Thus, in the present invention, insofar as the arrangement provided is such that the position of the resiliently locking piece can be restricted as the coils of the compression coil spring are set in a closely contacting state, various modifications are possible as for the configuration of the compression coil spring and its mounting structure.

As described above, in accordance with the present invention, the closely contacting height is set in advance in such a manner as to assume a position for restricting an amount of movement of the head when the compression coil spring is compressed and adjacent ones of the coils are brought into close contact with each other. Therefore, when an external force is applied to move the head of the resiliently locking piece in the inward direction of the cassette, the compression coil spring is prevented from deflecting more than its closely contacting state, and is thus capable of serving as a stopper for preventing the deflection of the resiliently locking piece in the inward direction of the cassette with respect to an unexpected external force applied to the head. Accordingly, it is unnecessary to form a large stopper jutting out in the inward direction of the cassette case as in the conventional case. Additionally, it is possible to overcome the problem of a decline in moldability due to sink marks in the molding of the cassette case and a decline in the fluidity of a resin, and it is possible to ensure stable action of the resiliently locking piece over extended periods of time.

What is claimed is:

1. A magnetic tape cassette, comprising:
    a slider fitted slidably along a bottom of a cassette case in such a manner as to be capable of opening or closing a guide-inserting portion on a front side of said cassette case and reel-shaft; inserting holes in the bottom of said case
    resiliently locking pieces formed in the bottom of said cassette case along the bottom in a cantilevered fashion and each having a head at a free end thereof for fitting in an engaging hole in said slider so as to retain said slider; and
    a compression coil spring disposed between said head and an upper half of said cassette case, for maintaining a resilient force for said head in a thickness-wise direction of said cassette, a coil diameter of said compression coil spring being greater from the inner side of said head toward said upper half, and coils of said compression coil spring being set so that when said spring is in a state of maximum compression with each coil in contact with adjacent coils, said spring supports said head from an inward direction of said cassette and prevents the displacement of said resiliently locking piece in the inward direction of said cassette.

2. A magnetic tape cassette according to claim 1, wherein a length of said coil compression spring in maximum compression is defined within a range between 4 mm to 6 mm.

3. A magnetic tape cassette, comprising:
    a slider fitted slidably along a bottom of a cassette case in such a manner as to be capable of opening or closing a guide-inserting portion on a front side of said cassette case and reel-shaft inserting holes in the bottom of said case;
    resiliently locking pieces formed in the bottom of said cassette case along the bottom in a cantilevered fashion and each having a head at a free end thereof for fitting in an engaging hole in said slider so as to retain said slider and
    a compression coil spring disposed between said head and an upper half of said cassette case, for maintaining a resilient force for said head in a thickness-wise direction of said cassette, said compression coil spring having a maximally compressed portion which is substantially not resilient in the compressing direction, and coils of said compression coil spring being set so that when said spring is in a state of maximum compression with each coil in contact with adjacent coils, said spring supports said head from an inward direction of said cassette and prevents the displacement of said resiliently locking piece in the inward direction of said cassette.

4. The magnetic tape cassette according to claim 2, wherein said maximally compressed portion of said compression coil spring is located at a center in length of said compression coil spring between upper and lower flexible portions.

5. A magnetic tape cassette, comprising:
a slider fitted slidably along a bottom of a cassette case in such a manner as to be capable of opening or closing a guide-inserting portion on a front side of said cassette case and reel-shaft inserting holes in the bottom of said case;
resiliently locking pieces formed in the bottom of said cassette case along the bottom in a cantilevered fashion and each having a head at a free end thereof for fitting in an engaging hole in said slider so as to retain said slider, each of said resiliently locking pieces being provided with a compression coil spring between said head and an upper half of said cassette case to maintain a resilient force for said head in a thickness-wise direction of said cassette;
a lower wall provided projectingly on a lower half of said cassette case in proximity to said compression coil spring in such a manner as to surround said spring; and
an upper wall provided projectingly on said upper half in such a manner as to extend toward the bottom side of said cassette further below an upper end of said lower wall,
wherein a lower end face of said upper wall is arranged to abut against said head of each of said resiliently locking pieces so as to restrict the movement of each of said resiliently locking pieces in an inward direction of said cassette.

6. A magnetic tape cassette according to claim 4, wherein said upper wall is provided in proximity to said spring.

7. A magnetic tape cassette according to claim 6, wherein cross sections of the upper and lower walls are formed such that their overall cross-sectional configuration forms a substantially circular ring.

8. A magnetic tape cassette according to claim 7, wherein the lower wall is formed in the shape of a first arc and the upper wall is formed in the shape of a second arc, said second arc being smaller than said first arc.

9. A magnetic tape cassette according to claim 5, wherein a vertical length of the upper wall projects from said upper half such that the upper wall abuts against the resiliently locking piece when the head of the resiliently locking piece is pressed by an external force to a depth exceeding a predetermined depth.

10. A magnetic tape cassette according to claim 9, wherein said length is defined within a range between 5 mm to 7 mm.

* * * * *